United States Patent [19]
Berger et al.

[11] Patent Number: 6,121,741
[45] Date of Patent: *Sep. 19, 2000

[54] CONTROL DEVICE FOR OPERATING A WINDOW WIPER IN A MOTOR VEHICLE

[75] Inventors: Josef Berger, Wolfschlugen; Alf Blessing, Heiningen; Rainer Maeckel, Koenigswinter; Roland Mauser, Ludwigsburg, all of Germany

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/098,002

[22] Filed: Jun. 16, 1998

[30] Foreign Application Priority Data

Jun. 16, 1997 [DE] Germany ............ 197 25 351

[51] Int. Cl.$^7$ .................................................. G05B 5/00
[52] U.S. Cl. ........................................... 318/483; 318/444
[58] Field of Search .................................... 318/443, 444, 318/483, 484, DIG. 2; 250/250.12, 250.13

[56] References Cited

U.S. PATENT DOCUMENTS

| | | | |
|---|---|---|---|
| 4,339,698 | 7/1982 | Kearns | 318/444 |
| 4,499,410 | 2/1985 | Iacoponi et al. | 318/444 |
| 4,857,815 | 8/1989 | Erdelitsch et al. | 318/444 |
| 5,216,341 | 6/1993 | Nomura et al. . | |
| 5,336,980 | 8/1994 | Levers | 318/444 |
| 5,428,277 | 6/1995 | Stanton | 318/444 |
| 5,729,106 | 3/1998 | Pientke et al. | 318/483 |

FOREIGN PATENT DOCUMENTS

| | | |
|---|---|---|
| 0 504 606 | 9/1992 | European Pat. Off. . |
| 40 00 735 | 7/1991 | Germany . |
| 44 03 661 | 8/1995 | Germany . |
| 195 19 471 | 11/1996 | Germany . |
| 195 36 621 | 4/1997 | Germany . |
| 58-115451 | 8/1983 | Japan . |
| 59-14563 | 1/1984 | Japan . |
| 8-318823 | 3/1996 | Japan . |

Primary Examiner—Robert E. Nappi
Assistant Examiner—Rina I. Duda
Attorney, Agent, or Firm—Evenson, McKeown, Edwards & Lenahan, PLLC

[57] ABSTRACT

A control device operates a window wiper in a motor vehicle, and includes a switching device for the selection of several wiping functions, a sensor device for determining a wetting degree of a window, and an electronic analyzing system. The window wiper is capable of being operated, depending on the wiping function selected by the user, in a continuous wiping operation and/or in a single wiping operation. The electronic analyzing system, during a first wiping function, analyzes the determined wetting degree of the window and, depending on the determined wetting degree of the window, in a continuous wiping operation, sets a wiping frequency and/or, in a single wiping operation, activates a wiping cycle for the window wiper. The electronic analyzing system sets the wiping frequency of the window wiper in the continuous wiping operation during a second wiping function within a second wiping frequency band, and during a third wiping function, within a third wiping frequency band, and during the first wiping function, within a first wiping frequency band, depending on the analysis of the wetting degree of the window, an actual wiping frequency being set which is as optimal as possible. If, during the switching between the wiping functions, a change of the wiping frequency band is required, the actual wiping frequency, during a change from the second wiping frequency band to the third wiping frequency band is increased by a defined number "n" wiping cycles per minute or, during a change from the third wiping frequency band to the second wiping frequency band is reduced by a defined number "m" wiping cycles per minute.

11 Claims, 3 Drawing Sheets

CONTROL DEVICE FOR OPERATING A WINDOW WIPER IN A MOTOR VEHICLE

BACKGROUND AND SUMMARY OF THE INVENTION

This application claims the priority of German Application No. 197 25 351.2, filed Jun. 16, 1997, the disclosure of which expressly incorporated by reference herein.

The invention relates to a control device for operating a window wiper in a motor vehicle and, more particularly, to a control device having a switching device for the selection of several wiping functions, a sensor device for determining a wetting degree of a window, and an electronic analyzing system. The window wiper is capable of being operated, depending on the wiping function selected by the user, in a continuous wiping operation and/or in a single wiping operation. The electronic analyzing system, during a first wiping function, analyzes the determined wetting degree of the window and, depending on the determined wetting degree of the window, in a continuous wiping operation, sets a wiping frequency and/or, in a single wiping operation, activates a wiping cycle for the window wiper.

The window wipers in a motor vehicle have the purpose of providing the driver with an optimal view through the windows during precipitation. The driver's most important viewing direction is toward the front through the windshield. The windshield is normally cleaned by means of at least one windshield wiper which comprises a wiper arm, a wiper motor, a wiper gear and a wiper linkage, in which case the wiper arm can be driven in a continuous operation with fixed wiping frequencies. In addition, as a rule, a single wiping operation can be selected which, when a switching device is operated, carries out a one-time wiping operation, and/or an intermittent function can be selected which carries out a wiping cycle with a defined wiping cycle duration and with defined pause periods between two wiping cycles.

It is stipulated by law that the window wipers of window wiping systems must operate at at least two wiping frequencies, in which case one wiping frequency must comprise more than 45 wiping cycles per minute. The second wiping frequency must not amount to less than 10 wiping cycles per minute and to more than 55 wiping cycles per minute. The difference between the largest and the smallest wiping frequency must amount to at least 15 wiping cycles per minute. In the case of the intermittent operation, it must be ensured that at least 10 wiping cycles per minute are carried out.

In the case of window wipers, the basic problem arises that, on the one hand, a wiping frequency for the wiper arm should be selected which is as low as possible because the wiping result improves with a decreasing wiping frequency, but, on the other hand, the wiping frequency must not be selected too low because then so-called slip stick effects will occur which are exhibited by a pronounced rattling and jumping of the wiper arms. The wiping frequency of the wiper arm is limited in the upward direction by the deterioration of the wiping results because of aquaplaning effects and by the design of the wiper motor. Since, as a rule, the involved wiper motors are not rotational-speed-controlled, it is an additional factor that the wiping frequency of the wiper arm will change when loaded, for example, by wind effects, the degree of dryness of the window or by snow.

German Patent document DE 40 00 735 A1 discloses a control device of the above-mentioned type for the operation of a window wiper, having a switching device for selecting a wiping operation, having a sensor device for determining a wetting degree of a window and having an electronic analyzing system, in which case the window wiper can be operated in a continuous wiping operation and/or a single wiping operation. In the case of an automatic wiping operation, as a function of the determined wetting degree of the window, the electronic analyzing system switches between the continuous wiping operation and the single wiping operation, in which case, as function of the determined wetting degree of the window in the continuous wiping operation, a wiping frequency is adjusted and in the single wiping operation, a wiping cycle for the wiper arm is activated.

It is considered to be a disadvantage in this case that no measures are provided for operating the window wiper in the automatic wiping operation if the sensor device fails or operates defectively.

European Patent Document EP 504 606 B1 discloses a control device for the operation of a window wiper in the case of which different wiping operations can be set by means of an operating-type switch. In this case, by means of another operating element, automatic functions can be activated which change the pause periods in the intermittent operation and the wiping frequency in the continuous operation as a function of the vehicle speed and/or the degree of wetness detected by means of a rain sensor. In addition, as a function of the set wiping operation, by means of a preselecting element, several pause periods for the intermittent operation and several wiping frequencies for the continuous wiping operation can be manually adjusted.

It is considered to be a disadvantage in this case that operation of the window cleaning system requires high expenditures of time, whereby the user's attention may be diverted from the traffic situation. In addition, because of the use of several operating elements, the suggested solution is expensive.

It is an object of the present invention to improve the operating comfort of a window cleaning system of the above-mentioned type and carry out the control of the window cleaning system at reasonable cost, and to ensure an appropriate operation of the window wiper in the event of a defect.

According to the invention, this object is achieved by a control device having a switching device for the selection of several wiping functions, a sensor device for determining a wetting degree of a window, and an electronic analyzing system. The window wiper is capable of being operated, depending on the wiping function selected by the user, in a continuous wiping operation and/or in a single wiping operation. The electronic analyzing system, during a first wiping function, analyzes the determined wetting degree of the window and, depending on the determined wetting degree of the window, in a continuous wiping operation, sets a wiping frequency and/or, in a single wiping operation, activates a wiping cycle for the window wiper. The electronic analyzing system sets the wiping frequency of the window wiper in the continuous wiping operation during the first wiping function within a first wiping frequency band ($f_{1u}$ to $f_{2o}$), during a second wiping function, within a second wiping frequency band ($f_{1u}$ to $f_{1o}$), and during a third wiping function, within a third wiping frequency band ($f_{2u}$ to $f_{2o}$), depending on the analysis of the wetting degree of the window 1. The actual wiping frequency being set is as low as possible. If, during the switching between the wiping functions, a change of the wiping frequency band is required, the actual wiping frequency, during a change from the second wiping frequency band ($f_{1u}$ to $f_{1o}$) to the third wiping frequency band ($f_{2u}$ to $f_{2o}$) is increased by a defined number "n" wiping cycles per minute or, during a change from the third wiping frequency band ($f_{2u}$ to $f_{2o}$) to the second wiping frequency band ($f_{1u}$ to $f_{1o}$) is reduced by a defined number "m" wiping cycles per minute. Further advantageous developments of the invention are described herein.

The main idea of the invention consists of providing, for the operation of a window wiper, a switching device with four switching positions for the selection of a wiping function ("off", "optimized wiping", "continuous wiping step 1", "continuous wiping step 2") by the user, as well as a sensor device for determining a wetting degree of a window. In order to achieve an improved wiping result, by means of an electronic analyzing system, which analyzes the wetting degree of the window determined by the sensor device, an automatic continuous or step-by-step adaptation of the wiping frequency to the wetting degree of the window is carried out within the wiping function selected by the user.

During the "continuous wiping step 1" wiping function in a continuous wiping operation within a second wiping frequency band, for example, between $f_{1u}=33$ and $f_{1o}=45$ wiping cycles per minute, and during the "continuous wiping step 2" wiping function in a continuous wiping operation within a third wiping frequency band, for example, between $f_{2u}=48$ and $f_{2o}=60$ wiping cycles per minute, the wiping frequency is adaptable to the wetting degree of the window. The second and the third wiping frequency bands may adjoin one another directly, may partially overlap or may be separated from one another. During the adaptation of the wiping frequency to the wetting degree of the window, the electronic analyzing system attempts, by means of an electronic triggering system which may be part of the electronic analyzing system, to set a wiping frequency which is as optimal as possible, for example, a wiping cycle duration which is as long as possible. During the "optimized wiping" wiping function, the wiping frequency during a continuous wiping operation within a first frequency band, which comprises the second and the third wiping frequency band, can be changed, for example, between $f_{1u}=33$ and $f_{2o}=60$ wiping cycles per minute.

In addition, within the "optimized wiping" wiping function, a single wiping operation is provided, in which case, in the single wiping operation, a wiping cycle and/or the duration of the wiping cycle is activated as a function of the wetting degree of the window and/or is set by the electronic analyzing system. For the adaptation of the wiping frequency in the continuous wiping operation or for activating a wiping cycle in the single wiping operation, a signal of the sensor device, which is constructed, for example, as an optical rain sensor, is used and is analyzed in the electronic analyzing system. The rain sensor supplies a signal which is dependent on the wetting degree of the window, in which case it must be ensured that the rain sensor is situated in the range of the wiping field. By this measure, the operation of the window wiper can be adapted to the wetting degree of the window and thus to the intensity of the precipitation. The use of the switching device with four switching positions has the advantage that a user can operate the window cleaning system in the usual manner.

In addition, the electronic analyzing system ensures that, in the event of a failure or a malfunctioning of the rain sensor, the operation of the window wiper corresponds to the legal regulations, in that, in the event of a failure or a malfunctioning of the rain sensor, the electronic analyzing system during the "optimized wiping" wiping function, sets the duration of a wiping cycle and the pause duration between two wiping cycles such that at least 10 wiping actions per minute take place; for example, the pause duration is set to be fixed at 4.5 seconds and the duration of the wiping cycle is set to be fixed at 1.5 seconds—this would correspond to a wiping frequency of 40 wiping cycles per minute in the continuous wiping operation. During the "continuous wiping step 1" wiping function, the electronic analyzing system fixedly sets a first wiping frequency, for example, 40 wiping cycles per minute, and during the "continuous wiping step 2" wiping function, it fixedly sets a second wiping frequency, for example, 55 wiping cycles per minute. This ensures an appropriate operation of the window cleaning system even in the event of a failure of the rain sensor. In this emergency operation, the user can make a selection between the "off" wiping function (operation of the window wiper switched off), the "optimized wiping" wiping function with a fixedly set intermittent operation, the "continuous wiping step 1" wiping function with a fixedly set first wiping frequency, and the "continuous wiping step 2", wiping function with a fixedly set second wiping frequency. The failure or the malfunctioning of the rain sensor can be determined during an internal system monitoring, which takes place, for example, automatically after each vehicle start, for example, through the use of the electronic analyzing system.

During normal operation, when it starts to rain, the user can select a wiping function by operating the switching device, for example, by rotating a steering column shift lever.

When the switching device is switched from the switching position 0 ("off" wiping function) into the switching position 1 ("optimized wiping" wiping function), if the analysis of the sensor signal of the sensor device is also carried out in the switching position 0 ("off" wiping function), as a function of the wetting degree of the window, an optimal wiping operation (single wiping operation or continuous wiping operation) with an optimal wiping cycle duration in the single wiping operation or an optimal wiping frequency in the continuous wiping operation is set via the electronic analyzing system. If the analysis of the sensor signal takes place only in the switching positions 1 to 3, after the switching from the switching position 0 ("off" wiping function) to the switching position 1 ("optimized wiping" wiping function), a wiping cycle is carried out with a defined wiping cycle duration, for example, 1.5 seconds—this corresponds to a wiping frequency of 40 wiping cycles per minute in the continuous operation. Subsequently, the electronic analyzing system analyzes the sensor signal of the sensor device and an optimal wiping operation which is adapted to the wetting degree of the window with an optimal wiping cycle duration in the single wiping operation or an optimal wiping frequency in the continuous wiping operation is set by the electronic analyzing system. In this case, the analysis of the sensor signal by means of the electronic analyzing system takes place continuously or at regular intervals. Thus, in the "optimized wiping" wiping function, the electronic analyzing system can carry out, without any intervention by the user, all switching and/or adapting actions for the optimal operation of the window wiper in order to achieve an optimal wiping result as a function of the wetting degree of the window.

When the switching device is switched from the switching position 0 ("off" wiping function) into the switching position 2 ("continuous wiping step 1" wiping function), if the analysis of the sensor signal of the sensor device is also carried out in the switching position 0 ("off" wiping function), as a function of the wetting degree of the window, an optimal wiping frequency within the second wiping frequency band is set by the electronic analyzing system. If the analysis of the sensor signal takes place only in the switching positions 1 to 3, after the switching from the switching position 0 ("off" wiping function) to the switching position 2 ("continuous wiping step 1" wiping function), a first medium wiping frequency, for example, 40 wiping cycles per minute, is set. Subsequently, the electronic analyzing system analyzes the sensor signal of the sensor device and an optimal wiping frequency within the second wiping frequency band is set which is adapted to the wetting degree of the window.

When the switching device is switched from the switching position 1 ("optimized wiping" wiping function) to the switching position 2 ("continuous wiping step 1" wiping function), if the actual wiping cycle duration corresponds to a wiping frequency of the second wiping frequency band, this wiping frequency is taken over or, if the actual wiping cycle duration corresponds to a wiping frequency of the third wiping frequency band, this wiping frequency is reduced by a defined number "m" of wiping cycles per minute and is set as the new wiping frequency by the electronic analyzing system. If the actual wiping cycle duration corresponds to a wiping frequency which is between the second and the third frequency band, this wiping frequency is reduced by a defined number "z" of wiping cycles per minute and is set as the new wiping frequency by the electronic analyzing system. In this case, the numerical values "m" and "z" are set such that the new wiping frequency is within the second wiping frequency band. Subsequently, the electronic analyzing system continuously analyzes the sensor signal of the sensor device and sets an optimal wiping frequency within the second wiping frequency band which is adapted to the wetting degree of the window.

When the switching device is switched from the switching position 0 ("off" wiping function) into the switching position 3 ("continuous wiping step 2" wiping function), if the analysis of the sensor signal of the sensor device is also carried out in the switching position 0 ("off" wiping function), as a function of the wetting degree of the window, an optimal wiping frequency within the third wiping frequency band is set by the electronic analyzing system. If the analysis of the sensor signal takes place only in the switching positions 1 to 3, after the switching from the switching position 0 ("off" wiping function) to the switching position 3 ("continuous wiping step 2" wiping function), a second medium wiping frequency, for example, 55 wiping cycles per minute, is set. Subsequently, the electronic analyzing system analyzes the sensor signal of the sensor device and an optimal wiping frequency within the third wiping frequency band is set which is adapted to the wetting degree of the window.

When the switching device is switched from the switching position 1 ("optimized wiping" wiping function) to the switching position 3 ("continuous wiping step 2" wiping function), if the actual wiping cycle duration corresponds to a wiping frequency of the third wiping frequency band, this wiping frequency is taken over or, if the actual wiping cycle duration corresponds to a wiping frequency of the second wiping frequency band, this wiping frequency is increased by a defined number "n" of wiping cycles per minute and is set as the new wiping frequency by the electronic analyzing system. If the actual wiping cycle duration corresponds to a wiping frequency which is between the second and the third frequency band, this wiping frequency is increased by a defined number "z" of wiping cycles per minute and is set as the new wiping frequency by the electronic analyzing system. In this case, the numerical values "n" and "z" are set such that the new wiping frequency is within the third wiping frequency band. Subsequently, the electronic analyzing system continuously analyzes the sensor signal of the sensor device and sets an optimal wiping frequency within the third wiping frequency band which is adapted to the wetting degree of the window.

When the switching device is switched from the switching position 2 ("continuous wiping step 1" wiping function) to the switching position 3 ("continuous wiping step 2" wiping function), the actual wiping frequency is increased by a defined number "n" of wiping cycles per minute and is set as the new wiping frequency by the electronic analyzing system. Subsequently, the electronic analyzing system continuously analyzes the sensor signal of the sensor device and sets an optimal wiping frequency within the third wiping frequency band which is adapted to the wetting degree of the window.

When the switching device is switched from the switching position 3 ("continuous wiping step 2" wiping function) to the switching position 2 ("continuous wiping step 1" wiping function), the actual wiping frequency is reduced by a defined number "m" of wiping cycles per minute and is set as the new wiping frequency by the electronic analyzing system. Subsequently, the electronic analyzing system continuously analyzes the sensor signal of the sensor device and sets an optimal wiping frequency within the second wiping frequency band which is adapted to the wetting degree of the window.

When the switching device is switched from the switching position 3 ("continuous wiping step 2" wiping function) or from the switching position 2 ("continuous wiping step 1" wiping function) to the switching position 1 ("optimized wiping" wiping position), the respective wiping cycle duration of the actual wiping frequency is taken over. Subsequently, as a function of the wetting degree of the window, the electronic analyzing system sets an optimal wiping operation (single wiping operation or continuous wiping operation) with an optimal wiping cycle duration in the single wiping operation or an optimal wiping frequency of the first wiping frequency band in the continuous wiping operation.

Other objects, advantages and novel features of the present invention will become apparent from the following detailed description of the invention when considered in conjunction with the accompanying drawings.

DETAILED DESCRIPTION OF THE DRAWINGS

Figure 1:
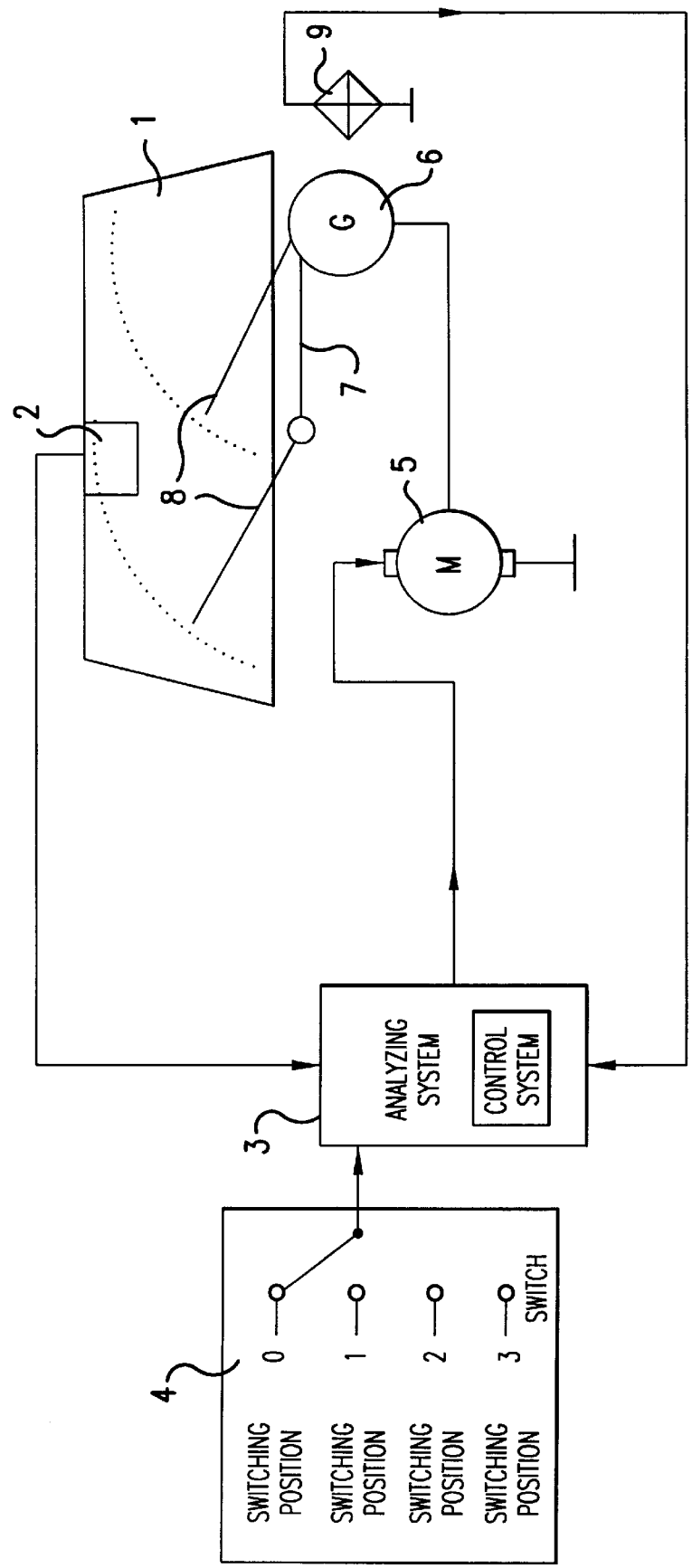
FIG. 1 is a schematic representation of an embodiment of the present invention.

As illustrated in FIG. 1, the control device for a window wiper comprises a window 1 with a sensor device 2 which determines the wetting degree of the window 1 and transmits it to an electronic analyzing system 3 by means of a signal which is proportional to the wetting degree of the window 1. In the embodiment, the sensor device 2 is constructed as an optical sensor. From this signal, the electronic analyzing system 3 determines the optimal wiping cycle duration as well as the point in time of the activating of a wiping cycle in the single wiping operation or the optimal wiping frequency in the continuous wiping operation for the respective selected wiping function.

The selection of the wiping function by the user takes place by means of a switching device 4, which is constructed, for example, as a steering column shift lever and which, in the representation, has four switching positions. A first switching position (0) is assigned to an "off" wiping function, which corresponds to a switched-off operation of the window wiper; a second switching position 1 is assigned to an "optimized wiping" wiping function; a third switching position 2 is assigned to a "continuous wiping step 1" wiping function; and a fourth switching position 3 is assigned to a "continuous wiping step 2" wiping function. In the described embodiment, the continuous analysis of the sensor signal from the sensor device 2 by the electronic analyzing system 3 takes place only in switching steps 1 to 3. However, it is also conceivable to carry out the continuous analysis of the sensor signal when the ignition is switched on also in switching position 0. This has the advantage that, immediately after the switching of the switching device from the switching position 0 into one of the operating switching positions 1 to 3, a setting of the wiping frequency for the continuous wiping operation or of the wiping cycle duration for the single wiping operation can be carried out which is adapted to the wetting degree of the window. The setting of the wiping frequency or of the wiping cycle duration and the activating of a wiping cycle take place by means of an electronic control system which in the embodiment is part of the electronic analyzing system 3.

The electronic control system controls the wiper motor 5 at a controlled voltage, for example, by pulse width modulation, and therefore permits a setting of the rotational speed of the wiper motor 5 and thus the setting of the wiper frequency and of the wiping cycle period by changing the control voltage. The wiper motor 5 is coupled to the wiper linkage 7 by way of a gear 6. Wiper arms 8 are fastened to the wiper linkage 7. By means of a rotational speed sensor 9, the rotational speed of the motor and/or of the gear can be determined and transmitted to the electronic analyzing system 3. From it, a conclusion can then be drawn concerning the speed of the wiper arms 8 and concerning the wiping frequency. By means of a corresponding change of the control voltage, this wiping frequency can then be adapted to the actual demand. In addition, the electronic analyzing system 3 regularly carries out system monitoring, for example, at each vehicle start. If a faulty sensor device or a failure of the sensor device is determined during this system monitoring, the electronic analyzing system switches to an emergency operation. This can be indicated to the user by corresponding visual or acoustic indicating devices. In the emergency operation, it is provided to operate the window wiper in the switching position 1 in an intermittent operation with a fixed wiping cycle duration, for example, 1.5 seconds, and with a fixed pause duration between two wiping cycles, for example, 4.5 seconds, so that at least 10 wiping cycles per minute are obtained. In switching position 2, the window wiper is operated in the continuous wiping operation at a fixed wiping frequency $f_1$, for example, 40 wiping cycles per minute, and in switch position 3, the window wiper is operated in the continuous wiping operation at a fixed wiping frequency $f_2$, for example, 55 wiping cycles per minute. The switching position 0, furthermore, corresponds to the switched-off operation of the window wiper.

Figure 2:
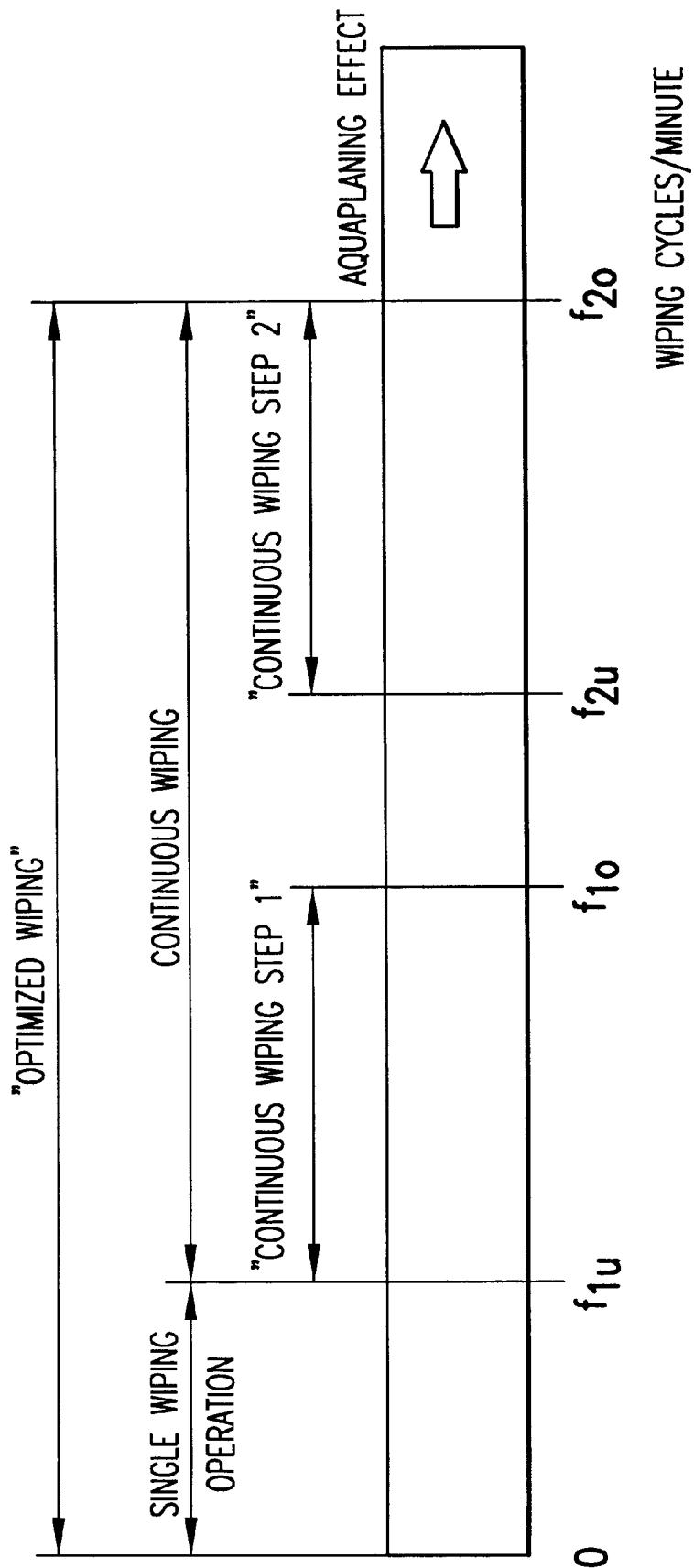
FIG. 2 is a diagram schematically representing the wiping frequencies within the selectable wiping functions according to the present invention.

FIG. 2 is a schematic representation of a diagram of the wiping functions which can be selected by the user by means of the switching device 4 and of the assigned wiping frequencies for the wiper arm.

As illustrated in FIG. 2, during the "continuous wiping step 1" wiping function in the continuous wiping operation, an optimal wiping frequency can be set within a second wiping frequency band which is limited in the downward direction by the lowest wiping frequency $f_{1u}$ and in the upward direction by a wiping frequency $f_{1o}$, as a function of the wetting degree of the window 1. During the switching from the "off" wiping function to the "continuous wiping step 1" wiping function, first a first medium wiping frequency $f_1$, for example, 40 wiping cycles per minute, is set. This wiping frequency may correspond to the fixedly set wiping frequency for the emergency operation. After the first wiping cycle, as the result of the analysis of the sensor signal of the sensor device by means of the electronic analyzing system, the actual wiping frequency is adapted to the wetting degree of the window 1 within the second wiping frequency band.

As further illustrated in FIG. 2, during the "continuous wiping step 2" wiping function in the continuous wiping operation, the optimal wiping frequency within a third wiping frequency band, which is limited in the downward direction by the wiping frequency $f_{2u}$ and in the upward direction by a highest wiping frequency $f_{2o}$, can be set as a function of the wetting degree of the window 1. During the switching from the "off" wiping function to the "continuous wiping step 2" wiping function, first a second medium wiping frequency $f_2$, for example, 55 wiping cycles per minute, is set. This wiping frequency may correspond to the fixedly set wiping frequency for the emergency operation. After the first wiping cycle, the actual wiping frequency is then adapted by the analysis of the sensor signal of the sensor device by means of the electronic analyzing system to the wetting degree of the window 1 within the third wiping frequency band.

Figure 3:
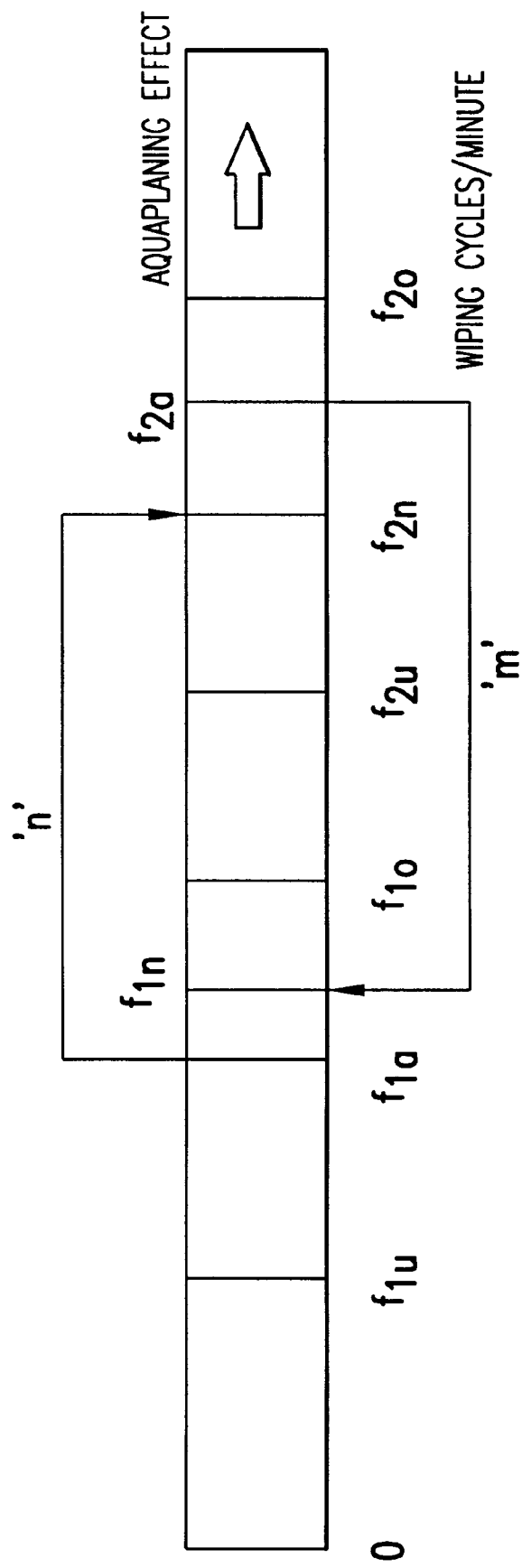
FIG. 3 is a schematic representation of the switching action between two wiping functions in the continuous wiping operation according to the present invention.

As illustrated in FIG. 3, during the switching from the "continuous wiping step 1" wiping function to the "continuous wiping step 2" wiping function, the actual wiping frequency $f_{1a}$ of the second wiping frequency band is increased by "n" wiping cycles per minute. The new actual wiping frequency $f_{2n}$ will now be within the third wiping frequency band and, by means of the analysis of the sensor signal of the sensor device, is adapted by means of the electronic analyzing system 3 to the wetting degree of the window 1 within the third wiping frequency band. Analogously, during the switching from the "continuous wiping step 2" wiping function to the "continuous wiping step 1" wiping function, the actual wiping frequency $f_{2a}$ of the third wiping frequency band is reduced by "m" wiping cycles per minute, and the new actual wiping frequency $f_{1n}$ is adapted within the second wiping frequency band to the wetting degree of the window 1.

Furthermore, FIG. 2 shows that the "optimized wiping" wiping function comprises a single wiping operation and a continuous wiping operation. As a function of the wetting degree of the window 1, during the "optimized wiping" wiping function in the continuous wiping operation, an optimal wiping frequency is set within the first wiping frequency band. The possible setting range of the wiping frequency in the continuous operation is therefore limited in the downward direction by the lowest wiping frequency $f_{1u}$ and in the upward direction by the highest wiping frequency $f_{2o}$. The lowest possible wiping frequency $f_{1u}$ is selected such that no slip stick effects can occur during the continuous wiping operation and amounts to, for example, 33 wiping cycles per minute. The highest possible wiping frequency $f_{2o}$ is selected such that no aquaplaning effects can occur. If the analysis of the sensor signals of the sensor device 2 indicates that the optimal wiping frequency for the wetting degree of the window 1 is lower than the lowest wiping frequency $f_{1u}$, an automatic switching takes place to the single wiping operation. In the single wiping operation, as a function of the wetting degree of the window 1, single wiping cycles are activated which are separated from one another by different or by the same pause durations. The wiping cycle duration is also a function of the wetting degree of the window.

During the switching from the "off" wiping function to the "optimized wiping" wiping function, first a medium wiping cycle duration of, for example, 1.5 seconds is set; this corresponds to a wiping frequency of 40 wiping cycles per minute in the continuous wiping operation. Subsequently, as a function of the wetting degree of the window 1, an optimal operation of the window wiper is set. During the switching from the "continuous wiping step 1" wiping function or from the "continuous wiping step 2" wiping function, to the "optimized wiping" wiping function, first the wiping cycle duration of the actual wiping frequency is taken over, and subsequently, as a function of the wetting degree of the window 1, an optimal operation of the window wiper is set. During the switching from the "optimized wiping" wiping function to the "continuous wiping step 1" wiping function or the "continuous wiping step 2" wiping function, if the actual wiping cycle period of the "optimized wiping" wiping function corresponds to a wiping frequency of the newly selected wiping frequency band, this wiping frequency is taken over as the actual wiping frequency for the continuous operation. If the actual wiping cycle duration of the "optimized wiping" wiping function corresponds to a wiping frequency of the first or the second wiping frequency band, in which case the wiping frequency is not in the selected wiping frequency band, analogously to the approach during the switching between the "continuous wiping step 1" and the "continuous wiping step 2" wiping functions, the actual wiping frequency is increased by "n" wiping cycles or is reduced by "m" wiping cycles in order to operate the window wiper in the selected wiping frequency band. In this case, the numerical values for "n" and "m" are defined such that the desired wiping frequency band is reached after the switching. If the actual wiping cycle duration of the "optimized wiping" wiping function corresponds to a wiping frequency which is between the second and the third frequency band, thus a wiping frequency between $f_{1o}$ and $f_{2u}$, the actual wiping frequency is either increased by "z" wiping cycles per minute if a switching to the "continuous wiping step 2" wiping function took place, or reduced by "z" wiping cycles if a switching to the "continuous wiping step 1" wiping function took place, in which case the numerical value for "z" is defined such that the desired wiping frequency band is reached after the switching. As another possibility in this case, during the switching to the "continuous wiping step 1" wiping function, the actual wiping frequency can be set to the upper wiping frequency $f_{1o}$ of the second frequency band, and during switching to the "continuous wiping step 2" wiping function, the actual wiping frequency can be set to the lower wiping frequency $f_{2u}$ of the third wiping frequency band.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for operating a window wiper in a motor vehicle, said control device having a switching device for selecting several wiping functions, a sensor device for sensing a wetting degree of a window, and an electronic analyzing system, said window wiper being capable of being operated, depending on the selected wiping function, in at least one of a continuous wiping operation and a single wiping operation, wherein said electronic analyzing system, during a first wiping function, analyzes the sensed wetting degree of the window and, depending on the sensed wetting degree, sets a wiping frequency in a continuous wiping operation and/or activates a wiping cycle for the window wiper in a single wiping operating, further wherein said electronic analyzing system sets the wiping frequency of the window wiper in the continuous wiping operation during the first wiping function within a first wiping frequency band, during a second wiping function, within a second wiping frequency band, and during a third wiping function, within a third wiping frequency band, and wherein depending on an analysis of the wetting degree of the window, an actual wiping frequency is set as low as possible, and if, during a switching between the several wiping functions, a change of the wiping frequency band is required, then the actual wiping frequency, during a change from the second wiping frequency band to the third wiping frequency band is increased by a defined number "n" wiping cycles per minute or, during a change from the third wiping frequency band to the second wiping frequency band is reduced by a defined number "m" wiping cycles per minute.

2. Control device for the operation of a window wiper in a motor vehicle according to claim 1, wherein during the switching from the second or third wiping function to the first wiping function, the respective wiping cycle duration of the set actual wiping frequency is taken over for the single wiping operation, or the respective actual wiping frequency is taken over for the continuous wiping operation.

3. Control device for the operation of a window wiper in a motor vehicle according to claim 1, wherein during the switching from the first wiping function to the second or third wiping function, if the actual wiping cycle duration corresponds to an actual wiping frequency, which is between the second and the third frequency band, the actual wiping frequency is either increased by "z" wiping cycles per minute when a switching takes place from the first wiping function to the third wiping function, or is reduced by "z" wiping cycles per minute when a switching takes place from the first wiping function to the second wiping function, the numerical value for "z" being defined such that the new wiping frequency after the switching is in the desired wiping frequency band.

4. Control device for the operation of a window wiper in a motor vehicle according to claim 1, wherein in an emergency operation during the first wiping function, a fixed wiping cycle duration and a fixed pause duration between two wiping cycles, and during the second wiping function, a continuous wiping operation with a first fixed wiping frequency, and during the third wiping function, a continuous wiping operation with a second fixed wiping frequency, is set by the electronic analyzing system, the difference between the first and the second fixed wiping frequency corresponding to "n" wiping cycles per minute.

5. Control device for the operation of a window wiper in a motor vehicle according to claim 1, wherein the analysis of the wetting degree of the window is also carried out during an "off" wiping function which corresponds to a switched-off operation of the window wiper.

6. A control device for operating a window wiper in a motor vehicle, comprising:

a switch operable to select one of several wiping functions;

a sensor providing a wetting degree sensor signal for a window of the motor vehicle;

an electronic analyzing system receiving the wetting degree sensor signal and controlling a wiping frequency of the window wiper, said window wiper being capable of operating in at least one of a continuous wiping mode and a single wiping mode depending on the wiping function selected by the switch;

wherein the electronic analyzing system sets the wiping frequency in the continuous wiping mode during a first wiping function within a first wiping frequency band, during a second wiping function within a second wiping frequency band, and during a third wiping function within a third wiping frequency band, depending on an analysis of the wetting degree of the window, such that an actual wiping frequency is set as low as possible; and wherein when a change of the wiping frequency band is required due to a switching between the several wiping functions, the actual wiping frequency is increased by a defined number "n" wiping cycles per minute during a change from the second wiping frequency band to the third wiping frequency band, and is reduced by a defined number "m" wiping cycles per minute during a change from the third wiping frequency band to the second wiping frequency band.

7. A method of controlling a window wiper in a motor vehicle, the met hod comprising the acts of:

setting a wiping frequency of the window wiper via an electronic analyzing system in a continuous wiping mode during a first wiping function within a first wiping frequency band, during a second wiping function within a second wiping frequency band, and during a third wiping function within a third wiping frequency band such that, depending on an analysis of a wetting degree of a window, an actual wiping frequency is as low as possible;

when a change of the wiping frequency band is required during a switching between wiping functions, increasing the actual wiping frequency by a defined number "n" wiping cycles per minute during a change from the second wiping frequency band to the third wiping frequency band and decreasing the actual wiping frequency by a defined number "m" wiping cycles per minute during a change from the third wiping frequency band to the second wiping frequency band.

8. The method according to claim 7, further comprising the act of:

taking over a respective wiping cycle duration of the actual wiping frequency during a switching from one of the second and third wiping functions to the first wiping function for a single wiping operation, and taking over the respective actual wiping frequency for the continuous wiping operation.

9. The method according to claim 7, further comprising the act of:

during a switching from the first wiping function to one of the second and third wiping function, increasing by "z" wiping cycles per minute the actual wiping frequency when the switching takes place from the first wiping function to the third wiping function if the actual wiping cycle duration corresponds to an actual wiping frequency which is between the second and the third wiping frequency band, or reducing by "z" wiping cycles per minute the actual wiping frequency when the switching takes place from the first wiping function to the second wiping function, wherein the numerical value for "z" is defined such that the new wiping frequency after the switching is in the desired wiping frequency band.

10. The method according to claim 7, further comprising the act of:

in an emergency operation during the first wiping function, setting a fixed wiping cycle duration and a fixed pause duration between two wiping cycles, and during the second wiping function, setting a continuous wiping operation with a first fixed wiping frequency, and during the third wiping function, setting a continuous wiping operation with a second fixed wiping frequency, via the electronic analyzing system, wherein the difference between the first and the second fixed wiping frequencies corresponds to "n" wiping cycles per minute.

11. The method according to claim 7, further comprising the act of also carrying out an analysis of the wetting degree of the window during an "OFF" wiping function corresponding to a switched-off operation of the window wiper.

* * * * *